United States Patent
Itoh et al.

(10) Patent No.: US 10,567,979 B2
(45) Date of Patent: *Feb. 18, 2020

(54) WIRELESS COMMUNICATION DEVICE, WIRELESS COMMUNICATION SYSTEM, WIRELESS COMMUNICATION METHOD, AND PROGRAM

(71) Applicant: SONY CORPORATION, Tokyo (JP)

(72) Inventors: Katsutoshi Itoh, Tokyo (JP); Hideyuki Suzuki, Tokyo (JP); Masahiko Naito, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/937,663

(22) Filed: Mar. 27, 2018

(65) Prior Publication Data

US 2018/0220311 A1 Aug. 2, 2018

Related U.S. Application Data

(63) Continuation of application No. 15/482,223, filed on Apr. 7, 2017, now Pat. No. 9,961,570, which is a (Continued)

(30) Foreign Application Priority Data

Apr. 22, 2009 (JP) .................................. 2009-104445

(51) Int. Cl.
  *H04W 4/00* (2018.01)
  *H04W 24/02* (2009.01)
  *H04W 84/20* (2009.01)
(52) U.S. Cl.
  CPC .......... *H04W 24/02* (2013.01); *H04W 84/20* (2013.01)

(58) Field of Classification Search
  CPC ..................................................... H04W 24/02
  See application file for complete search history.

(56) References Cited

U.S. PATENT DOCUMENTS 5,652,752 A * 7/1997 Suzuki ................. H04B 7/2643
                                                    370/330
5,805,670 A    9/1998 Pons
(Continued)

FOREIGN PATENT DOCUMENTS

CN         1701570 A        11/2005
JP         11-146030         5/1999
(Continued)

OTHER PUBLICATIONS

Office Action dated Feb. 26, 2013 in Japanese Application No. 2009-104445.
(Continued)

*Primary Examiner* — Guang W Li
(74) *Attorney, Agent, or Firm* — Xsensus LLP

(57) ABSTRACT

There is provided a wireless communication device including a control-message creation/transmission-instruction unit which sends notification information via a wireless communication network and also sends response information in the case of receiving notification information sent from another device, a reception/interpretation processing unit which receives, from another device which has received the notification information of the wireless communication device, response information of such other device and also receives the notification information sent from such other device, and an operation mode determination unit which determines, based on operation mode determination information included in the notification information of such other device or the response information of such other device, that the (Continued)

wireless communication device is caused to operate as one of a master device and a slave device.

14 Claims, 12 Drawing Sheets

Related U.S. Application Data continuation of application No. 14/280,107, filed on May 16, 2014, now Pat. No. 9,674,716, which is a continuation of application No. 12/709,964, filed on Feb. 22, 2010, now Pat. No. 8,767,690.

(56) References Cited

U.S. PATENT DOCUMENTS

| | | | |
|---|---|---|---|
| 6,456,841 B1 | 9/2002 | Tomimori | |
| 6,603,747 B2* | 8/2003 | Asai | H04B 7/18523 370/322 |
| 6,664,891 B2 | 12/2003 | Davies et al. | |
| 6,792,048 B1* | 9/2004 | Lee | H04N 7/141 375/240.26 |
| 7,046,649 B2* | 5/2006 | Awater | H04W 16/14 370/338 |
| 7,269,648 B1* | 9/2007 | Krishnan | G06F 16/27 709/224 |
| 7,539,748 B2* | 5/2009 | Williams | H04L 41/0681 709/223 |
| 7,664,753 B2* | 2/2010 | Shelton | G06F 21/6245 707/783 |
| 7,673,008 B2* | 3/2010 | Kojima | G06F 15/16 709/208 |
| 7,706,342 B2* | 4/2010 | Yang | H04L 61/6022 370/338 |
| 7,990,891 B2* | 8/2011 | Lu | H04L 29/12283 370/254 |
| 8,009,642 B2* | 8/2011 | Palm | H04L 69/24 370/206 |
| 8,170,480 B1* | 5/2012 | Kammer | H04L 63/102 455/41.2 |
| 8,280,016 B2 | 10/2012 | Ogawa | |
| 2002/0002034 A1* | 1/2002 | Davies | H04B 1/713 455/41.2 |
| 2002/0044549 A1* | 4/2002 | Johansson | H04L 45/02 370/386 |
| 2002/0055978 A1* | 5/2002 | Joon-Bo | H04W 84/20 709/209 |
| 2002/0090968 A1* | 7/2002 | Lee | H04W 72/1247 455/527 |
| 2002/0114303 A1* | 8/2002 | Crosbie | H04B 7/269 370/338 |
| 2003/0031208 A1* | 2/2003 | Anehem | H04W 28/14 370/474 |
| 2003/0147362 A1* | 8/2003 | Dick | H04B 7/269 370/324 |
| 2004/0114538 A1* | 6/2004 | Bouet | H04W 84/20 370/254 |
| 2005/0099978 A1* | 5/2005 | Chandra | H04L 47/56 370/338 |
| 2005/0243795 A1* | 11/2005 | Kim | H04B 7/2643 370/347 |
| 2005/0262216 A1* | 11/2005 | Kashiwabara | H04L 12/2803 709/208 |
| 2006/0128402 A1* | 6/2006 | Lee | H04W 72/082 455/464 |
| 2006/0198337 A1* | 9/2006 | Hoang | H04W 16/14 370/329 |
| 2006/0221856 A1 | 10/2006 | Quiroz | |
| 2006/0280145 A1 | 12/2006 | Revel | |
| 2008/0013473 A1* | 1/2008 | Proctor, Jr. | H04W 88/085 370/315 |
| 2008/0153553 A1* | 6/2008 | Horiguchi | H04W 84/20 455/567 |
| 2009/0154344 A1 | 6/2009 | Nishida | |
| 2009/0168707 A1* | 7/2009 | Nakae | H04L 45/30 370/329 |
| 2012/0129486 A1 | 5/2012 | Naim | |

FOREIGN PATENT DOCUMENTS

| | | |
|---|---|---|
| JP | 11-146030 A | 5/1999 |
| JP | 2002-281048 | 9/2002 |
| JP | 2006-157666 | 6/2006 |
| JP | 2006-526932 | 11/2006 |
| JP | 2007-49633 | 2/2007 |
| JP | 2007-74561 | 3/2007 |
| JP | 2008-23590 | 2/2008 |
| JP | 2008-515317 | 5/2008 |
| JP | 2008-523697 | 7/2008 |
| JP | 2008-187348 | 8/2008 |
| JP | 2008-283590 A | 11/2008 |
| WO | WO 2004/109996 A1 | 12/2004 |
| WO | WO 2005/034434 A1 | 4/2005 |

OTHER PUBLICATIONS

Office Action dated Jul. 23, 2013 in Japanese Application No. 2009-104445.
Office Action dated Mar. 31, 2014 in Chinese Patent Application No. 201010144873.1 (with English translation).
Combined Chinese Office Action and Search Report dated Mar. 31, 2014 in Patent Application No. 201010144873.1 with English Translation.
Office Action dated Aug. 19, 2014 in Japanese Patent Application No. 2013-252153.
Office Action dated Feb. 24, 2015 in Japanese Patent Application No. 2013-252153.
Office Action dated Feb. 16, 2016 in Japanese patent Application No. 2015-84929.
Office Action dated Aug. 18, 2015 in Japanese patent Application No. 2013-252153.
Office Action dated Nov. 16, 2017 in Chinese Patent Application No. 201510098539.X (with English translation).
Office Action dated Oct. 19, 2017 in Chinese Patent Application No. 201510099274.5 (with English translation).

\* cited by examiner

WIRELESS COMMUNICATION DEVICE, WIRELESS COMMUNICATION SYSTEM, WIRELESS COMMUNICATION METHOD, AND PROGRAM

CROSS-REFERENCE TO RELATED APPLICATIONS

This application is a continuation of U.S. Ser. No. 15/482,223, filed Apr. 7, 2017, which is a continuation of and is based upon and claims the benefit of priority under 35 U.S.C. § 120 of U.S. Ser. No. 14/280,107, filed May 16, 2014 (now U.S. Pat. No. 9,674,716), which is a continuation of U.S. Ser. No. 12/709,964, filed Feb. 22, 2010 (now U.S. Pat. No. 8,767,690), and claims the benefit of priority under 35 U.S.C. § 119 from Japanese Patent Application No. 2009-104445, filed Apr. 22, 2009. The entire contents of which are incorporated herein by reference.

BACKGROUND OF THE INVENTION

Field of the Invention

The present invention relates to a wireless communication device, a wireless communication system, a wireless communication method, and a program.

Description of the Related Art

Recently, a wireless network typified by the IEEE802.11 wireless LAN standard has become widespread in place of wired networks, because the degree of freedom of a device can be enlarged, and hence, the applications utilizing the wireless network are of wide variety (for example, refer to JP 2008-283590 A, JP 2008-523697 A, and JP 2007-74561 A).

SUMMARY OF THE INVENTION

In IEEE802.11 infrastructure mode, the operation of an access point (AP) is started first, and notification information (beacon) is periodically sent from the access point at a previously set frequency. A station (STA) finds the access point, which is a communication partner, by receiving the beacon sent from the access point.

On the other hand, there is assumed a method in which, regarding devices communicating with each other, the access point and the station are not previously distinguished, and the access point and the station are decided by negotiation after the completion of the connection. In the system, since the frequency at which the partner device operates is unknown, the devices send notification information such as a beacon by switching the frequency and can receive the notification information for the first time when the frequencies of the devices correspond to each other at a certain time, and thus, the connection therebetween can be completed.

However, in this case, whether the device operates as an access point or the station depends on which role the device plays at the time of connection. Accordingly, which of the devices operates as a master device and which of the devices operates as a slave device are decided randomly, regardless of an intention of the user, application, or a connection state with another device at the present moment.

In light of the foregoing, it is desirable to provide a wireless communication device, a wireless communication system, a wireless communication method, and a program that are novel and new, and that can reliably decide which device is to play the role of a master device at the time of searching a communication partner while sending notification information.

According to an embodiment of the present invention, there is provided a wireless communication device including a notification information transmission unit which sends notification information of the wireless communication device via a wireless communication network, a response information reception unit which receives, from another device which has received the notification information of the wireless communication device, response information of such other device with respect to the notification information of the wireless communication device, a notification information reception unit which receives notification information of such other device, a response information transmission unit which sends response information of the wireless communication device with respect to the notification information of such other device, and an operation mode determination unit which determines, based on operation mode determination information included in the notification information of such other device or the response information of such other device, that the wireless communication device is caused to operate as one of a master device and a slave device.

Further, the notification information may be a periodic message sent from the wireless communication device or such other device when operating as a master device or a message repeatedly sent within a fixed time period.

Further, the wireless communication device may further include a frequency setting unit which sets an operating frequency of the wireless communication device based on the notification information of such other device or the response information of such other device.

Further, the notification information may be communication request information sent from the wireless communication device or such other device when operating as a slave device, and the response information may be response information sent in response to the request information from the wireless communication device or such other device when operating as a master device.

Further, the wireless communication device may further include a frequency switching unit which switches a frequency at the time of sending the notification information of the wireless communication device and a frequency at the time of waiting for the notification information of such other device.

Further, the operation mode determination information may be at least any one of a capability of such other device, a state related to power supply of such other device, a priority index of such other device, a number of slave devices linked to such other device, a capability of the slave device linked to such other device, presence or absence of a master device/slave device-simultaneous operation function of such other device, and a state of communication application of the slave device linked to such other device.

Further, the wireless communication device may further include a comparison unit which compares the operation mode determination information received form such other device with corresponding information of the wireless communication device. The operation mode determination unit may determine, based on a result obtained from the comparison performed by the comparison unit, that the wireless communication device is caused to operate as one of a master device and a slave device.

Further, when the wireless communication device is connected to a plurality of such other devices via a wireless communication network, the operation mode determination unit may cause the wireless communication device to operate in a manner that an operation switches between a master device operation and a slave device operation.

Further, in a case where the wireless communication device operates as a slave device to a first other device which is newly connected thereto via a wireless communication network, the notification information of the wireless communication device may include an instruction for causing a second other device, which is already connected as a slave device to the wireless communication device, to operate as a slave device to the first other device.

According to another embodiment of the present invention, there is provided a wireless communication system which includes a first wireless communication device having a notification information transmission unit which sends notification information of the first wireless communication device via a wireless communication network, a response information reception unit which receives, from a second wireless communication device which has received the notification information of the first wireless communication device, response information of the second wireless communication device with respect to the notification information of the first wireless communication device, a notification information reception unit which receives notification information of the second wireless communication device, a response information transmission unit which sends response information of the first wireless communication device with respect to the notification information of the second wireless communication device, and an operation mode determination unit which determines, based on operation mode determination information included in the notification information of the second wireless communication device or the response information of the second wireless communication device, that the first wireless communication device is caused to operate as one of a master device and a slave device, and the second wireless communication device having a notification information transmission unit which sends the notification information of the second wireless communication device via a wireless communication network, a response information reception unit which receives, from the first wireless communication device, the response information of the first wireless communication device with respect to the notification information of the second wireless communication device, a notification information reception unit which receives the notification information of the first wireless communication device, a response information transmission unit which sends the response information of the second wireless communication device with respect to the notification information of the first wireless communication device, and an operation mode determination unit which determines, based on operation mode determination information included in the notification information of the first wireless communication device or the response information of the first wireless communication device, that the second wireless communication device is caused to operate as one of a master device and a slave device.

According to another embodiment of the present invention, there is provided a wireless communication method which includes the steps of sending notification information of a wireless communication device via a wireless communication network, receiving, from another device which has received the notification information of the wireless communication device, response information of such other device with respect to the notification information of the wireless communication device, receiving notification information of such other device, sending response information of the wireless communication device with respect to the notification information of such other device, and determining, based on operation mode determination information included in the notification information of such other device or the response information of such other device, that the wireless communication device is caused to operate as one of a master device and a slave device.

According to another embodiment of the present invention, there is provided a program for causing a computer to function as a unit configured to send notification information of a wireless communication device via a wireless communication network, a unit configured to receive, from another device which has received the notification information of the wireless communication device, response information of such other device with respect to the notification information of the wireless communication device, a unit configured to receive notification information of such other device, a unit configured to send response information of the wireless communication device with respect to the notification information of such other device, and a unit configured to determine, based on operation mode determination information included in the notification information of such other device or the response information of such other device, that the wireless communication device is caused to operate as one of a master device and a slave device.

According to the embodiments of the present invention described above, it becomes possible to reliably decide which device is to play the role of a master device at the time of searching a communication partner while sending notification information.

DETAILED DESCRIPTION OF THE EMBODIMENTS

Figure 1:
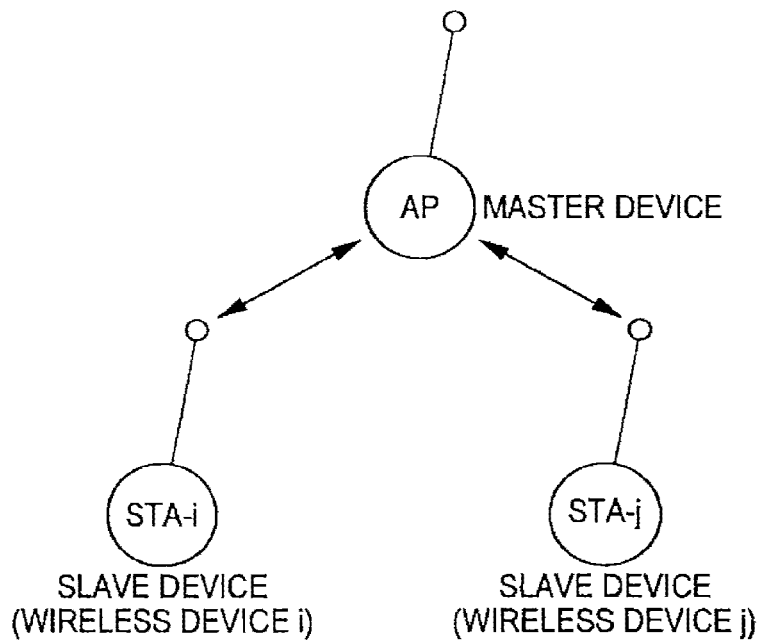
FIG. 1 is a schematic view showing the infrastructure mode having a network topology in which one master device (AP) is connected to a plurality of slave devices (STA-i and STA-j)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
<1. First Embodiment>
(1) Technological Basis
(2) State Transition of Wireless Communication Device According to First Embodiment
(3) Configuration of Wireless Communication Device According to First Embodiment
<2. Second Embodiment>
(1) System Configuration Example According to Second Embodiment
(2) State Transition of Wireless Communication Device According to Second Embodiment
(3) Configuration of Wireless Communication Device According to Second Embodiment 1. First Embodiment (1) Technological Basis It has become general that the devices are connected to each other based on IEEE802.11 wireless LAN. As shown in FIG. 1, IEEE802.11 includes the infrastructure mode having a network topology in which one master device (AP) is connected to a plurality of slave devices (STA-i and STA-j). Further, IEEE802.11 also includes an ad-hoc mode which enables direct connection between devices without the need for any master device. Note that, in the present specification, the master device and the slave device may be referred to as access point (AP) and station (STA), respectively.

The infrastructure mode is largely widespread both the inside and outside of homes, and plays a central role as one of the means for connecting mobile devices to the Internet. Since the infrastructure mode has a configuration in which an access point (AP; master device) is necessary, it is difficult to directly connect slave devices to each other. In the ad-hoc mode, although it is possible in terms of the specification of the ad-hoc mode to connect the devices to each other, the convenience thereof is relatively low from the viewpoints of compatibility, power consumption, and usability, and hence, the ad-hoc mode is not largely widespread at the present moment.

Figure 2A:
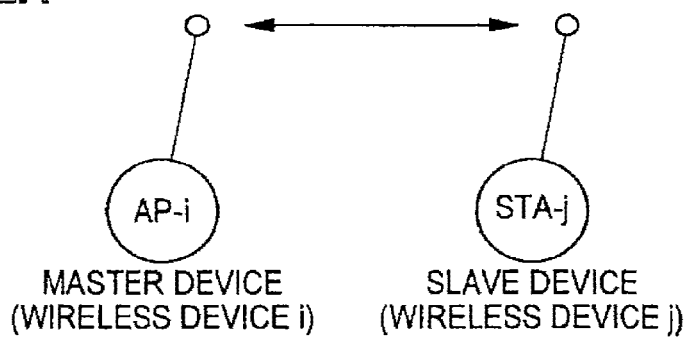
FIGS. 2A and 2B are schematic views each showing a system in which each of devices can be either a master device or a slave device depending on the situation and the devices can be connected to each other in a P2P (Peer to Peer) manner.
Figure 2B:
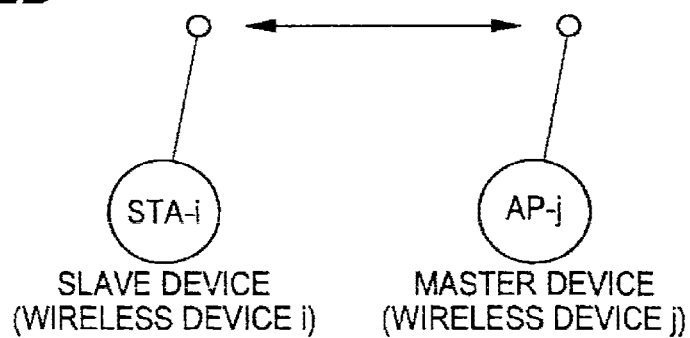

On the other hand, with the development of the device technology, there is assumed a wireless device as shown in FIGS. 2A and 2B, which has both a function of a master device (AP) and a function of a slave device (STA). In the system shown in FIGS. 2A and 2B, each of devices can be either a master device or a slave device depending on the situation and the devices can be connected to each other in a P2P (Peer to Peer) manner. Therefore, the devices can be connected to each other even in the environment with no particular wireless devices that correspond to the access point in the infrastructure mode. In FIG. 2A, the wireless device i and the wireless device j are connected to each other in a state where the wireless device i operates as a master device and the wireless device j operates as a slave device. Further, in FIG. 2B, the wireless device i and the wireless device j are connected to each other in a state where the wireless device i operates as a slave device and the wireless device j operates as a master device. The systems shown in FIGS. 2A and 2B are widely utilized and provide a connection in the infrastructure mode operation whose compatibility is secured, in the manner that one of the devices operates as a master device (AP) and the other wireless device operates as a slave device (STA).

In order to realize the wireless connection in the configuration as shown in FIGS. 2A and 2B that each of devices decides to play a role of either a master device (AP) or a slave device (STA) depending on the situation, it is necessary to determine the situation, that is, where (at which frequency) the communication partner exists and which device plays the role of a master device. On the other hand, it is necessary to minimize the connection time in order to improve the usability of the user.

Figure 3:
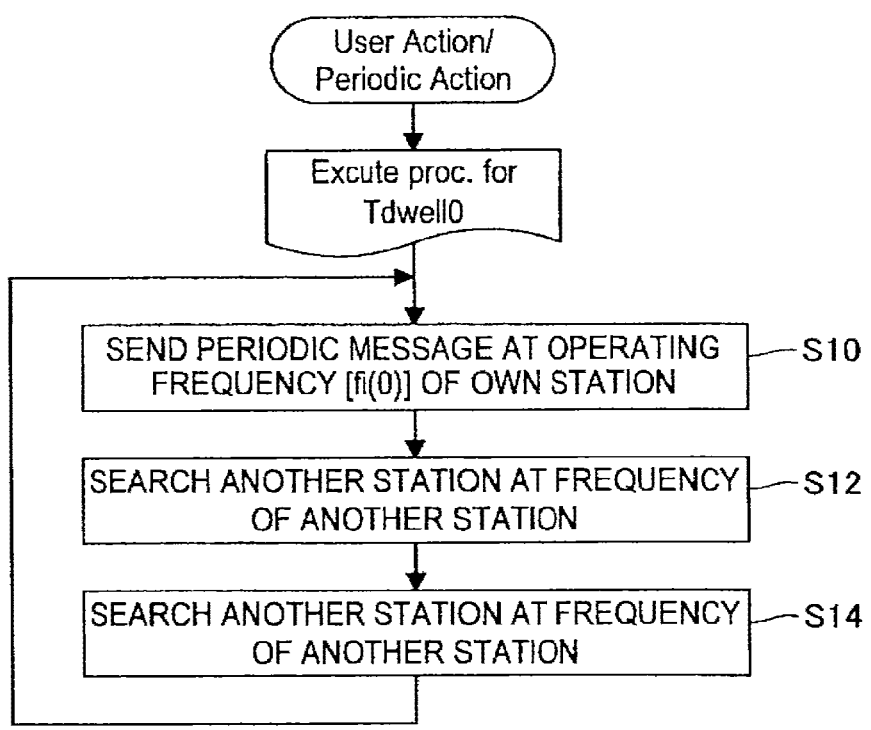
FIG. 3 is a flowchart showing, in a system of the P2P connection shown in FIGS. 2A and 2B, processing that each device performs in order to reduce connection time in a wireless system which is capable of operating at a plurality of frequencies.

FIG. 3 is a flowchart showing, in a system of the P2P connection shown in FIGS. 2A and 2B, processing that each device performs in order to reduce connection time in a wireless system which is capable of operating at a plurality of frequencies. Here, a description will be given of an example of processing performed in the wireless device i in the case where the wireless device i and the wireless device j shown in FIGS. 2A and 2B are connected to each other.

First, in step S10, the wireless device i sends a beacon (Beacon), which is a periodic message, at an operating frequency [fi(0)] of its own station. Next, in step S12, the wireless device i waits for a response message sent from another station (wireless device j) with respect to the beacon sent from the wireless device i at the operating frequency [fi(0)] of its own station. Next, in step S14, the wireless device i switches the frequency and searches a beacon sent from such other station at the frequency of such other station. After step S14, the processing returns to step S10.

As described above, the wireless device i operates as a master device which sends the beacon and waits for a response in steps S10 and 12, and operates as a slave device which searches the beacon in step S14. Thus, the wireless device i performs repeatedly the operation of a master device and the operation of a slave device. The processing shown in FIG. 3 is performed in the same manner in the case of the wireless device j.

Figure 4:
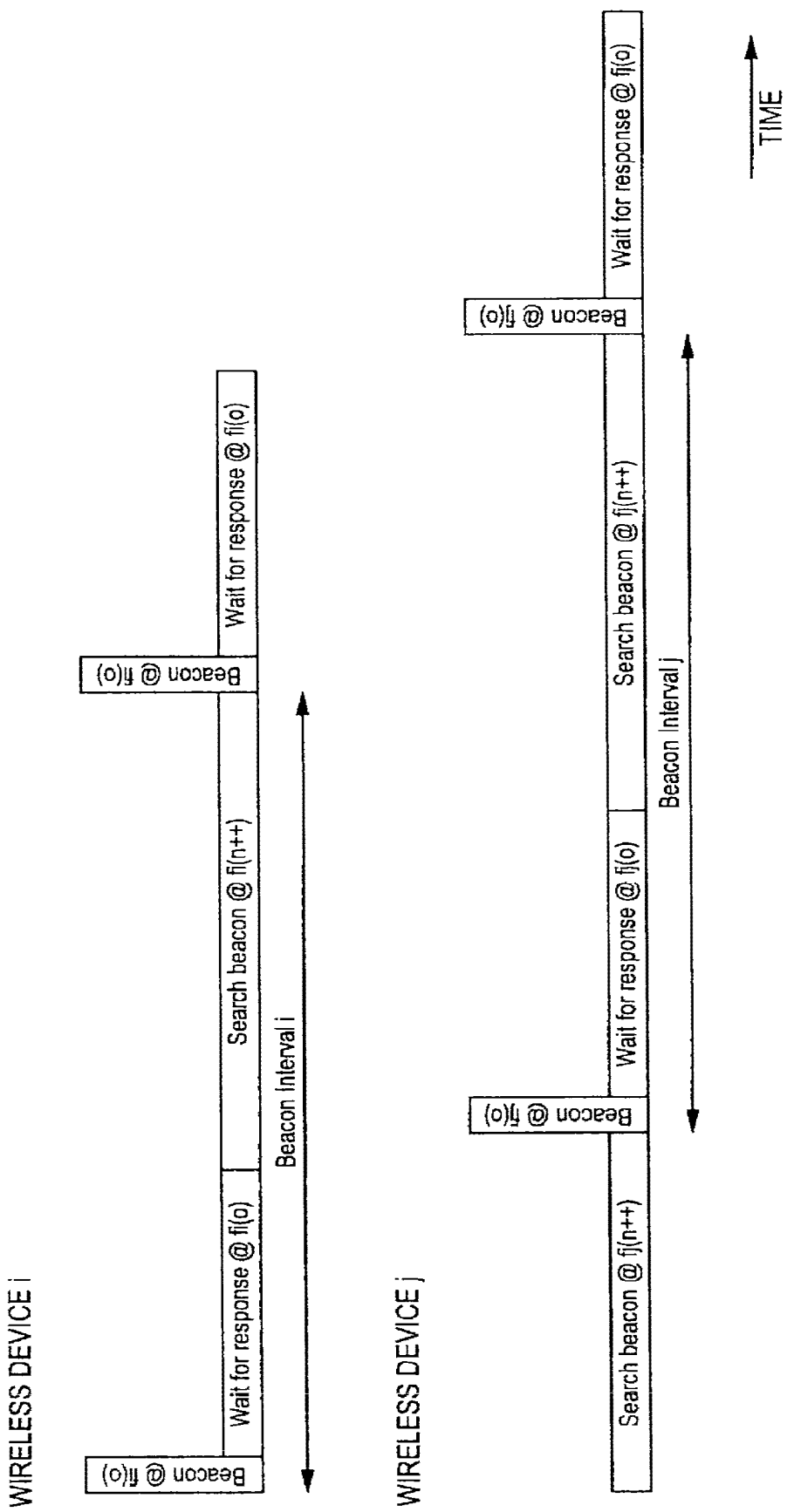
FIG. 4 is a schematic view showing a state when the processing shown in FIG. 3 is viewed in terms of a time axis of each of the wireless device i and the wireless device j.

FIG. 4 is a schematic view showing a state when the processing shown in FIG. 3 is viewed in terms of a time axis of each of the wireless device i and the wireless device j. As shown in FIG. 4, the wireless device i sends a beacon at a frequency fi(0) and then waits for a response with respect to the beacon at the frequency fi(0). After that, the wireless device i searches a beacon sent from another device (wireless device j) at a frequency $fi(n^{++})$. This operation is performed at an interval i, and after that, the wireless device i repeats the operation.

In the same manner, the wireless device j sends a beacon at a frequency fj(0) and then waits for a response with respect to the beacon at the frequency fj(0). After that, the wireless device j searches a beacon sent from another device (wireless device i) at a frequency fj($n^{++}$). This operation is performed at an interval j, and after that, the wireless device j repeats the operation. Note that, in FIG. 4, there is shown the case where the time at which the wireless device i sends the beacon and the time at which the wireless device j sends the beacon are different from each other. In FIG. 4, when the beacon sent from the wireless device i as a master device and the frequency searched by the wireless device j as a slave device correspond to each other, the wireless device i is connected to the wireless device j. In this case, the wireless device j sends to the wireless device i a response with respect to the beacon. Further, when the beacon sent from the wireless device j as a master device and the frequency searched by the wireless device i as a slave device correspond to each other, the wireless device j is connected to the wireless device i. In this case, the wireless device i sends to the wireless device j a response with respect to the beacon.

Figure 5:
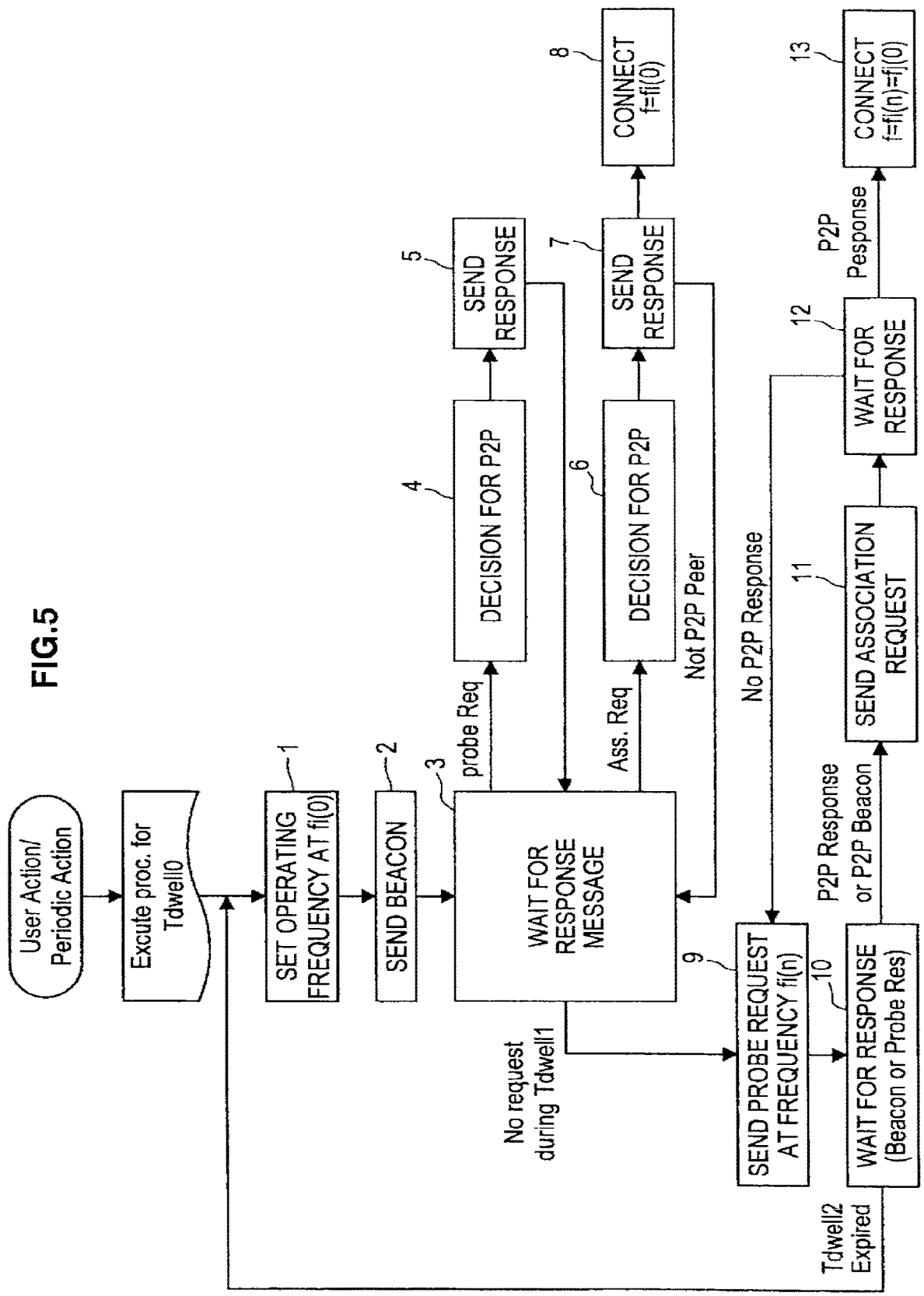
FIG. 5 is a state transition diagram showing, in a system of the P2P connection illustrated in FIG. 3 and FIG. 4, an operation of the wireless device i at the time of connecting the wireless device i and the wireless device j to each other.

FIG. 5 is a state transition diagram showing, in a system of the P2P connection illustrated in FIG. 3 and FIG. 4, an operation of the wireless device i at the time of connecting the wireless device i and the wireless device j to each other. Note that the wireless device j also operates in the same manner as the wireless device i. First, in State 1, since the wireless device i operates as a master device, the wireless operating frequency fi(0) which is previously decided is set (Select Operation Freq. fi(0)). Next, the wireless device i transits to State 2 and sends a periodic message (beacon) at the frequency fi(0) (Beacon Tx Proc). To the beacon, information about P2P connection is added. Examples of the information about P2P connection include information on SSID (Service Set Identifier) and information on the operating frequency. The addition of the information can be realized, in the case of IEEE 802.11, by adding an element of IEEE Std 802.11-2007 7.2.3.1 Beacon frame format. In the P2P connection information, a flag which indicates the connection validity is included.

Next, the wireless device i transits to State 3 and waits for a response message sent from another station (here, wireless device j) with respect to the beacon (Wait for Request). In IEEE802.11, State 3 corresponds to a state of waiting for a probe request (Probe Request) message and an association request (Association Request) message. The information about P2P connection is included in the probe request and the association request. The information about P2P connection can be realized by adding an element of IEEE Std 802.11-2007 7.2.3.4/8.

In the case where the wireless device i receives the probe request from the wireless device j in State 3, the wireless device i transits to State 4. In State 4, the wireless device i determines, based on the information about P2P connection (P2P element) included in the received probe request, whether the device to which the probe request is sent is connectable to the wireless device i in a P2P manner (Decision for P2P). Here, the information about P2P connection includes, in an automatic connection of WPS push button method or the like for example, information about a mechanism for permitting a connection only within a specific time period at the time of connecting the devices in which the push buttons are pressed to each other. In this case, the information includes information providing a notice that the connection is valid within a fixed time period. After State 4, the wireless device i transits to State 5 and sends a probe response message based on the result determined in State 4 (Send Response).

Further, in State 3, in the case where the wireless device i receives the association request from the wireless device j, the wireless device i transits to State 6. In State 6, the wireless device i determines, based on the information about P2P connection (Information Element) included in the association request, whether the device to which the association request is sent is a desired connection partner (Decision FOR P2P). In the same manner as in the case of the probe request, the information about P2P connection includes, in an automatic connection of WPS push button method or the like for example, information about a mechanism for permitting a connection only within a specific time period at the time of connecting the devices in which the push buttons are pressed to each other.

After State 6, the wireless device i transits to State 7 and sends an association response (Send Response). In the case where the wireless device i determines, based on the information element, that the partner to which the association request is sent is a desired connection partner, the wireless device i transits to State 8. In State 8, the wireless device i performs connection processing at a beacon transmission frequency fi(0) (Connect f=fi(0)). State 8 is Association/Authentication/Security setting sequence, and the wireless device i operates as AP. On the other hand, in State 7, in the case where the wireless device i determines, based on the information element, that the partner to which the association request is sent is not a desired connection partner, the wireless device i rejects the connection (Not P2P Peer) and returns to State 3.

In State 3, in the case where the wireless device i does not receive the probe request or the association request for a predetermined time period Tdwell1, the wireless device i transits to State 9.

From State 9 onwards, the operation of the wireless device i switches to the operation as a slave device. In State 9, the wireless device i sets the frequency at fi(n), and in the case of actively searching a master device (at the time of Active Search), the wireless device i sends a probe request (Probe Req). After State 9, the wireless device i transits to State 10 and performs the detection of the beacon and the detection of the probe response from the master device (here, wireless device j) at the frequency fi(n) (Passive Search).

In State 10, in the case where the beacon or the probe response is detected, the wireless device i transits to State 11 and sends an association request (Send Association Request). After that, the wireless device i transits to State 12 and waits for an association response (Wait for Response), which is a response with respect to the association request. In the case where there is a response, the wireless device i transits to State 13. Here, assuming that the wireless device j operates as a master device at an operating frequency fj(0), the connection processing is performed in State 13 at the frequency fi(n)=fj(0), which is the frequency of the wireless device j (Connect fi(n)=fj(0)). State 13 is Authentication/Security setting sequence, and the wireless device i operates as a slave device. On the other hand, in State 12, in the case where there is no response of the association response, the wireless device i transits to State 9.

In State 10, in the case where the beacon or the probe response is not detected for a predetermined time period Tdwell2, the wireless device i transits to State 1. From State 1 onwards, the wireless device i again operates as AP.

As described above, according to the operation shown in FIG. 5, when the wireless device i operates as a master device and in the case where there is no response to the probe request or the association request for a predetermined time period after transmission of the beacon, the wireless device i transits to the operation as a slave device (from State 3 to State 9). Further, when the wireless device i operates as a slave device and in the case of not receiving the beacon or the probe response for a predetermined time period, the wireless device i transits to the operation as a master device (from State 10 to State 1). Accordingly, there can be realized in each of the wireless devices i and j the operation in which the functions of a master device and a slave device described in FIG. 3 and FIG. 4 are repeated alternately.

When both the wireless device i and the wireless device j perform the operation, there are the case where the wireless device i operating as a master device is connected to the wireless device j (State 8) and the case where the wireless device i operating as a slave device is connected to the wireless device j (State 13), and both cases may occur in terms of probability. In the above configuration, whether to play the role of a master device or the role of a slave device in the P2P connection is decided randomly. In order to decide which wireless device plays which role in accordance with a certain regulation, it is desirable to more flexibly decide the roles and change the operating frequencies of the respective devices depending on the capabilities and the network operation state of each wireless device.

Figure 6:
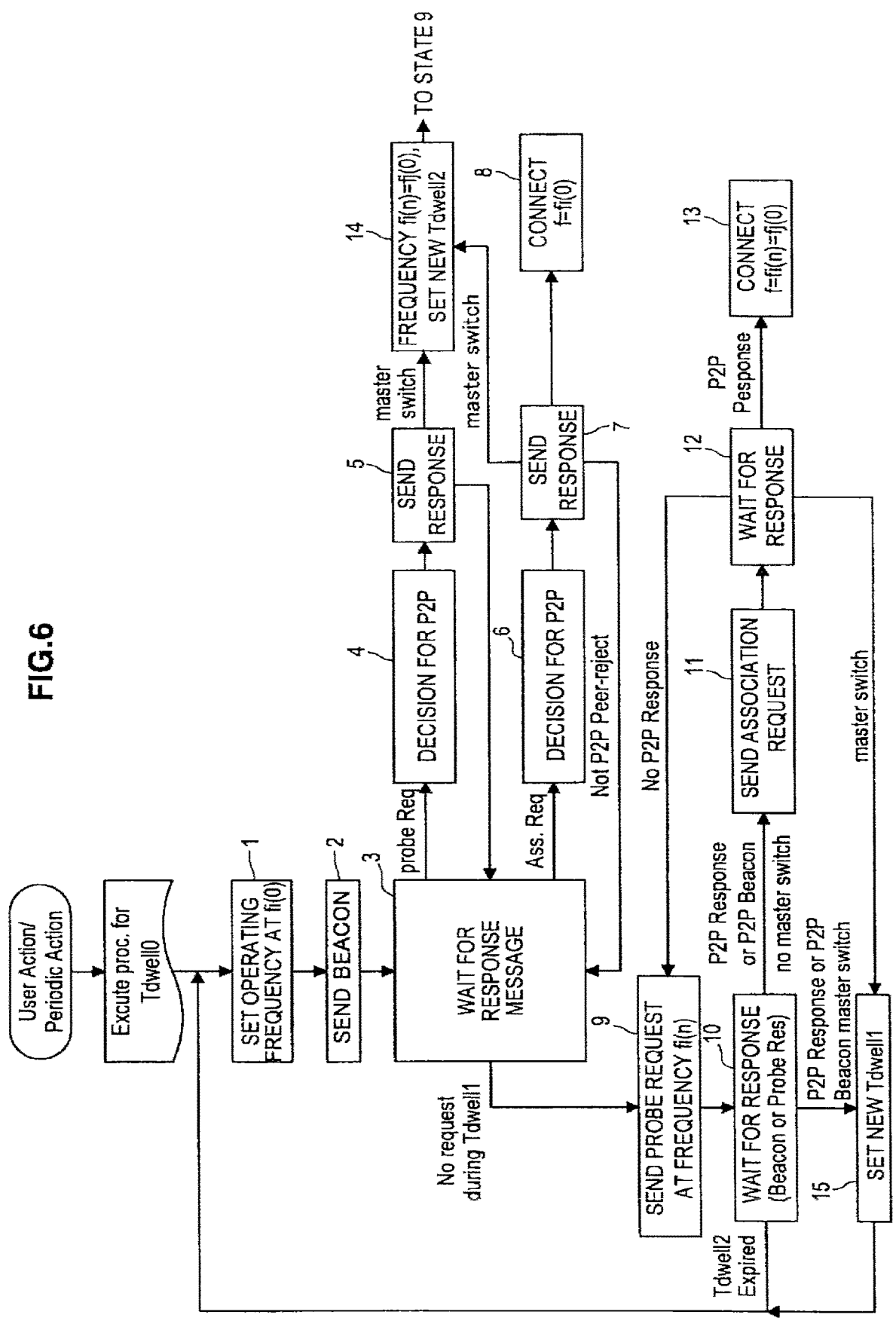
FIG. 6 is a state transition diagram showing an operation of a wireless communication device 100 according to a first embodiment of the present invention.

(2) State Transition of Wireless Communication Device According to First Embodiment FIG. 6 is a state transition diagram showing an operation of a wireless communication device 100 according to a first embodiment of the present invention. In this embodiment, a sequence for deciding a master device operation mode or a slave device operation mode is added after a connection partner is found, without adding a protocol, to thereby realize an appropriate connection system.

In FIG. 6, the basic operations in States having the same reference numerals as in FIG. 5 are performed in the same manner as in FIG. 5. In FIG. 6, State 14 and State 15 are added to States shown in FIG. 5. First, in State 1, since the wireless device i operates as a master device, the wireless operating frequency fi(0) is set (Select Operation Freq. fi(0)). The operating frequency can be decided based on the vacancy state (amount of interference) of a frequency band for sending a periodic message (beacon). Further, the operating frequency can be decided based on the number of the communication partners each of which uses the frequency for sending the beacon. Next, the wireless device i transits to State 2 and sends the beacon at the frequency fi(0) (Beacon Tx Proc). In the same manner as in FIG. 5, information about P2P connection is added to the beacon. Examples of the information about P2P connection include information on SSID (Service Set Identifier) and information on the operating frequency. The addition of the information can be realized, in the case of IEEE 802.11, by adding an element of IEEE Std 802.11-2007 7.2.3.1 Beacon frame format. In the P2P connection information, a flag which indicates the connection validity is included. Further, information for determining the master device operation mode or the slave device operation mode is added to the beacon. Elements in the information are described in detail below, and include information on capabilities of the wireless device, a power limitation situation, a priority index for master device operation, and the like.

Next, the wireless device i transits to State 3 and waits for a response message sent from another station (here, wireless device j) with respect to the beacon (Wait for Request). In IEEE802.11, State 3 corresponds to a state of waiting for a probe request (Probe Request) message and an association request (Association Request) message. The information about P2P connection is included in the probe request and the association request. The information about P2P connection can be realized by adding an element of IEEE Std 802.11-2007 7.2.3.4/8.

In the case where the wireless device i receives the probe request from the wireless device j in State 3, the wireless device i transits to State 4. In State 4, the wireless device i determines, based on the information about P2P connection (P2P element) included in the received probe request, whether the device to which the probe request is sent is connectable to the wireless device i in a P2P manner (Decision for P2P). Here, the information about P2P connection includes, in an automatic connection of WPS push button method or the like for example, information about a mechanism for permitting a connection only within a specific time period at the time of connecting the devices in which the push buttons are pressed to each other. Further, in the probe request message, information elements which are necessary for deciding the master device operation mode or the slave device operation mode are included.

In the case where the wireless device i determines, in State 4, that the partner is a desired connection partner that can establish a P2P connection therebetween, the wireless device i further determines in State 4 whether or not it is preferred that the wireless device i, rather than the partner wireless device j, operate as a master device. More specifically, the wireless device i extracts information elements necessary for deciding the master device operation mode or the slave device operation mode which are included in the probe request message, compares therewith the information elements of the wireless device i, and then determines whether the wireless device i operates as a master device or the partner operates as a master device. The determination of which device is to be operated as a master device is performed based on information elements of capabilities of the wireless device (e.g., a transmission capability (rate, format), a security capability, and a routing capability). Further, the determination of which device is to be operated as a master device is performed based on information elements such as a power limitation situation and a priority index for master device operation. Based on the information, it is determined that the device having higher capabilities, less power limitation, and higher priority index operates as a master device. On the other hand, in the case where it is determined that the partner is not a desired connection partner, the wireless device i transits to State 3.

In the case of deciding the master device operation mode or the slave device operation mode in accordance with a capability, it is determined that the device with higher capability operates as a master device because the device with higher capability more easily accepts a slave device. For example, in the case where the transmission capabilities of the wireless device i and the wireless device j are compared and, as a result, the wireless device i can comply with more transmission rate and transmission format than the wireless device j can, it is determined that the wireless device i operates as a master device, because more devices can be connected thereto. As an example, in the case where the wireless device i complies with IEEE 802.11b, g, and a and the wireless device j complies with only IEEE 802.11b, the wireless device i operates as a master device. Further, in the case where the security capability of the wireless device i is superior to that of the wireless device j, the wireless device i operates as a master device.

Further, the device having a routing capability can send the received information to a device linked to the device or to a network. Accordingly, in the case of deciding the master device operation mode or the slave device operation mode in accordance with the presence or absence of the routing capability, it is determined that the device having the routing capability operates as a master device and the device not having the routing capability operates as a slave device.

Further, in the case of deciding the master device operation mode or the slave device operation mode in accordance with the power limitation situation and in the case where one device is capable of being connected to an AC power source and the other device is battery-operated, the device capable of being connected to an AC power source operates as a master device, because the device capable of being connected to an AC power source can supply power more stably. Further, for example, in the case where both wireless devices i and j are battery-operated, it is determined that the device having higher remaining battery level operates as a master device.

Further, the priority index is a index which is decided in accordance with the kind of the device, and, for example, in the case where the wireless device i is included in a television receiver and the wireless device j is included in a recording device for recording video, the priority index is previously decided in accordance with the kind of the device. In the case where the priority index of the television receiver is higher than that of the recording device, and at the time of the wireless device i and the wireless device j are connected to each other, the wireless device i included in the television receiver operates as a master device and the wireless device j included in the recording device operates as a slave device. Further, in the case where the wireless device i is a notebook computer and the wireless device j is a mobile device, which of the devices operates as a master device is determined in accordance with the priority index of each device. In this case, the notebook computer operates as a master device and the mobile device operates as a slave device. Each wireless device has a previously set priority index.

After State 4, the wireless device i transits to State 5 and sends a probe response message based on the result determined in State 4 (Send Response). In the case of changing the roles of a master device and a slave device based on the result of the determination on whether the wireless device i should operate as a master device or as a slave device, a request for the change (Master Switch) is included in the probe response.

In the case where the wireless device i determines that the partner is a desired connection partner from the P2P connection information and, as a result of the determination on whether the wireless device i should operate as a master device or as a slave device, it is determined that the wireless device i operates as a slave device, a role changing request (Master Switch) is included in the probe response sent from the wireless device i. In this case, the wireless device i transits to State 14. In the probe request, information about the operating frequency of the partner device (wireless device j) is included. Based on the information, in State 14, the wireless device i sets the frequency of the wireless device i to the operating frequency at which the partner station (wireless device j) performs periodic message transmission (beacon transmission frequency fj(0)) (Set fi(n)=fj(0)). Further, in this case, since the wireless device i has received the probe request from the wireless device j, it is evident that there exists the wireless device j which operates as a master device, and thus, in State 10 that follows, it is expected that the wireless device i can reliably obtain a beacon or a probe response from the wireless device j. Therefore, in State 14, the wireless device i sets a timeout predetermined time period (master device search timeout value Tdwell2) in State 10 to a time period longer than a default value (Set new Tdwell2). In this manner, the wireless device i can reliably obtain the beacon and the probe response from the wireless device j. After State 14, the wireless device i transits to State 9.

Further, in State 3, in the case where the wireless device i receives the association request from the wireless device j, the wireless device i transits to State 6. In State 6, the wireless device i determines, based on the information about P2P connection (Information Element) included in the association request, whether the device to which the association request is sent is a desired connection partner (Decision for P2P). In the same manner as in the case of the probe request, the information about P2P connection includes, in an automatic connection of WPS push button method or the like for example, information about a mechanism for permitting a connection only within a specific time period at the time of connecting the devices in which the push buttons are pressed to each other. Further, in the association request message, information elements which are necessary for deciding the master device operation mode or the slave device operation mode are included.

Further, in State 6, the wireless device i determines whether or not it is preferred that the wireless device i, rather than the partner wireless device j, operate as a master device. More specifically, the wireless device i extracts information elements necessary for deciding the master device operation mode or the slave device operation mode which are included in the association request message, compares therewith the information elements of the wireless device i, and then determines whether the wireless device i operates as a master device or the partner operates as a master device. The determination of which device is to be operated as a master device is performed based on information elements of capabilities of the wireless device (e.g., a transmission capability (rate, format), a security capability, and a routing capability). Further, the determination of which device is to be operated as a master device is performed based on information elements such as a power limitation situation and a priority index for master device operation. Based on the information, it is determined that the device having higher capabilities, less power limitation, and higher priority index operates as a master device.

After State 6, the wireless device i transits to State 7 and sends an association response message based on the result determined in State 6 (Send Response). In the case of changing the roles of a master device and a slave device based on the result of the determination on whether the wireless device i should operate as a master device or as a slave device, a request for the change (Master Switch) is included in the association response.

In the case where the wireless device i determines that the partner is a desired connection partner from the P2P connection information and it is determined that the wireless device i operates as a master device, the wireless device i transits to State 8 and performs connection processing at a beacon transmission frequency fi(0) (Connect f=fi(0)). State 8 is Association/Authentication/Security setting sequence, and the wireless device i operates as a master device (AP). On the other hand, in State 7, in the case where the wireless device i determines, based on the result obtained in State 6, that the partner is not a desired connection partner, the wireless device i rejects the connection (Not P2P Peer) and returns to State 3.

Further, in the case where, based on the result obtained in State 6, the wireless device i determines that the partner is a desired connection partner and it is determined that the wireless device i operates as a master device, the wireless device i sends, in State 7, the association response including a request for changing the roles of a master device and a slave device (Master Switch). After sending the association response, the wireless device i transits to State 14. In the association request, information about the operating frequency of the partner device (wireless device j) is included. Based on the information, in State 14, the wireless device i sets the frequency of the wireless device i to the operating frequency at which the partner station (wireless device j) performs periodic message transmission (beacon transmission frequency $fj(0)$) (Set $fi(n)=fj(0)$). Further, the wireless device i sets a timeout predetermined time period (master device search timeout value Tdwell2) in State 10 to a time period longer than a default value (Set new Tdwell2). After State 14, the wireless device i transits to State 9.

In State 3, in the case where the wireless device i does not receive the probe request or the association request for a predetermined time period Tdwell1 (at the time of slave device search timeout), the wireless device i resets Tdwell1 to a default value and transits to State 9.

From State 9 onwards, the operation of the wireless device i switches to the operation as a slave device. In State 9, in the case of actively searching a master device (at the time of Active Search), the wireless device i sends a probe request (Probe Req) at a frequency $fi(n)$. After State 9, the wireless device i transits to State 10 and performs the detection of the beacon and the detection of the probe response from the master device (here, wireless device j) at the frequency $fi(n)$ (Passive Search).

In State 10, in the case where the beacon or the probe response is detected and when information that the partner device (wireless device j) operates as a slave device is not included therein (no master switch), the wireless device i transits to State 11. On the other hand, in State 10, in the case where the beacon or the probe response is detected and when information that the partner device (wireless device j) operates as a slave device is included therein (master switch), the wireless device i transits to State 15.

In State 11, the wireless device i sends an association request (Send Association Request). In the association request, there is included information of the result of the determination on whether the wireless device i should operate as a master device or as a slave device, the determination being made based on the beacon or the probe response received in State 10. After that, the wireless device i transits to State 12 and waits for an association response (Wait for Response), which is a response with respect to the association request. In the case where there is a response, the wireless device i analyses the message elements thereof. When it is found that, as a result of the analysis, a message that the partner device (wireless device j) operates as a master device is included in the association response, the wireless device i transits to State 13. In State 13, the connection processing is performed at a frequency $fi(n)=fj(0)$, which is the frequency of the master device (wireless device j) (Connect $fi(n)=fj(0)$). State 13 is Authentication/Security setting sequence, and the wireless device i operates as a slave device. On the other hand, in State 12, in the case where there is no response of the association response, the wireless device i transits to State 9.

Further, when it is found that, as a result of the analysis of the association response in State 12, there is a response indicating that the partner device (wireless device j) operates as a slave device, the wireless device i transits to State 15. In this case, since the wireless device i has received the association response, which includes the information that the wireless device j operates as a slave device, from the wireless device j, it is evident that there exists the wireless device j which operates as a slave device, and thus, it is expected that the wireless device i, while operating as a master device, can reliably obtain a response with respect to the beacon sent from the wireless device i. Therefore, in State 15, the wireless device i sets a timeout predetermined time period (slave device search timeout value Tdwell1) in State 3 to a time period longer than a default value (Set new Tdwell1) and transits to State 1. In this manner, the wireless device i can reliably obtain the response with respect to the beacon.

Further, in State 10, in the case where the beacon or the probe response is not detected for a predetermined time period Tdwell2, the wireless device i transits to State 1. From State 1 onwards, the wireless device i again operates as a master device.

As described above, according to the operation shown in FIG. 6, when the wireless device i operates as a master device, a determination is made on whether to function as a master device or as a slave device based on information elements included in the probe request and the association request which are sent from the partner device (State 4 and State 6). Further, when the wireless device i operates as a slave device, a determination is made on whether to function as a master device or as a slave device based on information elements included in the beacon, the probe response, and the association response which are sent from the partner device (State 10 and State 12). Accordingly, it becomes possible to decide which device is to operate as a master device and which device is to operate as a slave device, based on information on capabilities of the wireless device, a power limitation situation, a priority index for master device operation, and the like that are included in the information sent from the partner device.

Note that FIG. 6 shows the state transition of the wireless device i, and a state transition of the wireless device j is also the same as that shown in FIG. 6. In this case, the beacon that the wireless device i sends in State 1 corresponds to the beacon that the wireless device j waits for in State 10. Further, the probe request that the wireless device i receives in State 3 corresponds to the probe request that the wireless device j sends in State 9, and the association request that the wireless device i receives in State 3 corresponds to the association request that the wireless device j sends in State 11. Further, the probe response that the wireless device i sends in State 5 corresponds to the probe response that the wireless device j receives in State 10, and the association response that the wireless device i sends in State 7 corresponds to the association response that the wireless device j receives in State 12.

Further, State 8 of the wireless device i and State 13 of the wireless device j correspond to each other, and in the case where the wireless device i transits to State 8 and comes to operate as a master device, the wireless device j transits to State 13 and comes to operate as a slave device. In the case where wireless device j transits to State 8 and comes to operate as a master device, the wireless device i transits to State 13 and comes to operate as a slave device.

Figure 7:
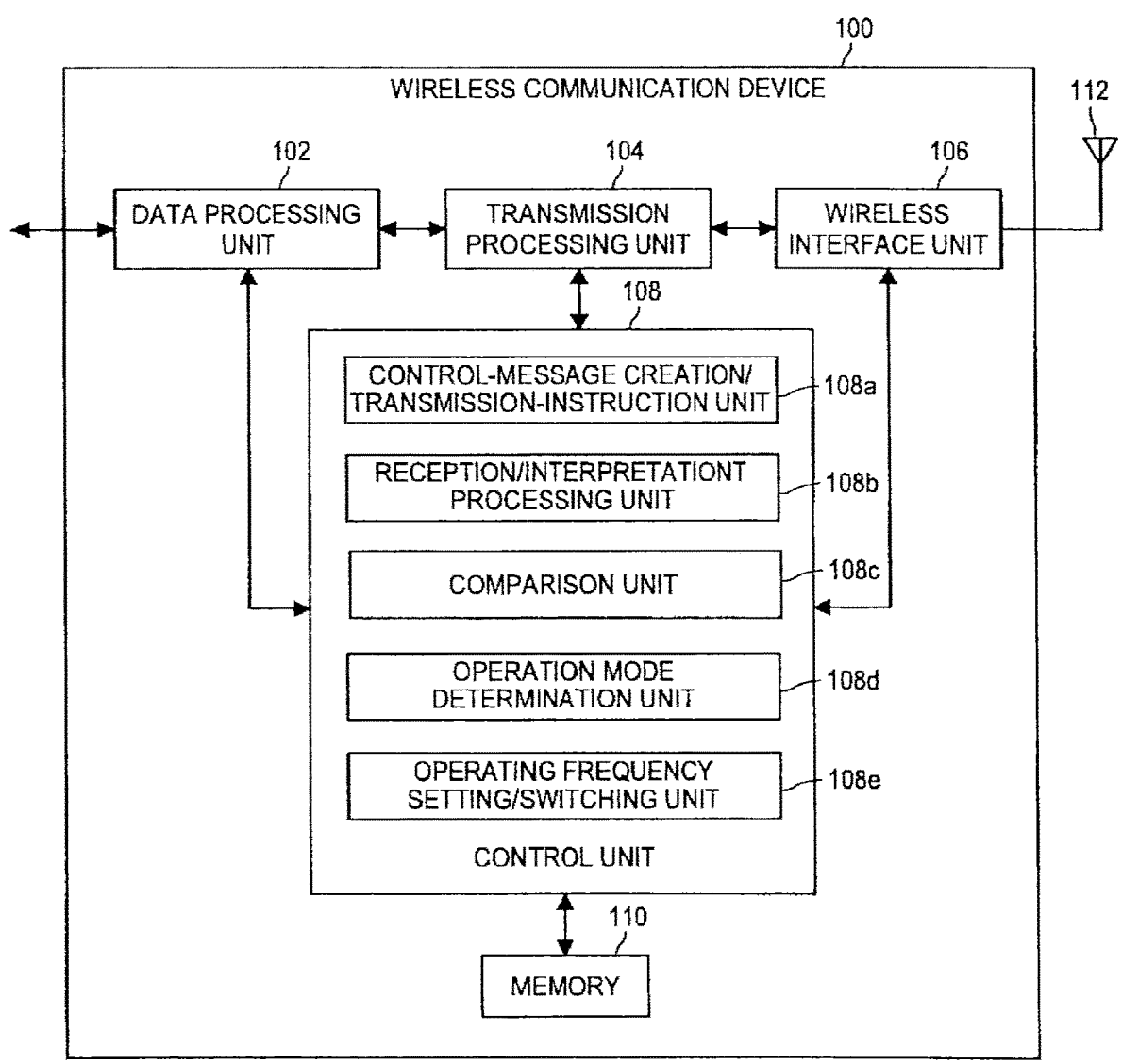
FIG. 7 is a block diagram showing an example of a configuration of the wireless communication device 100 according to the first embodiment.

(3) Configuration of Wireless Communication Device According to First Embodiment FIG. 7 is a block diagram showing an example of a configuration of the wireless communication device 100 according to the first embodiment. The wireless communication device 100 is configured to be communicable with another wireless communication device through a wireless communication network of the IEEE802.11a, IEEE802.11b, or IEEE802.11n wireless LAN standard or the like. As shown in FIG. 7, each wireless communication device 100 includes a data processing unit 102, a transmission processing unit 104, a wireless interface unit 106, a control unit 108, a memory 110, and an antenna 112.

At the time of transmission, the data processing unit 102 creates various data frames and various data packets in response to a request from, for example, a higher-level layer to supply the data frames and the data packets to the transmission processing unit 104. The transmission processing unit 104 at the time of transmission performs processing of addition of error detection codes such as various data headers or FCSs (Frame Check Sequences) to the packets created by the data processing unit 102, and provides the processed data to the wireless interface unit 106. The wireless interface unit 106 creates a modulation signal in a frequency band of a carrier wave from the data received from the transmission processing unit 104 and causes the antenna 112 to transmit the modulation signal as a wireless signal.

Further, in a receiving operation, the wireless interface unit 106 down-converts the wireless signal received by the antenna 112 and converts the wireless signal into a bit string to decode various data frames. More specifically, the wireless interface unit 106 can function as a transmission unit and a reception unit in cooperation with the antenna 112. The transmission processing unit 104 analyses a header added to the data frame supplied from the wireless interface unit 106. When the transmission processing unit 104 confirms that the data frame has no error based on the error detection code, the transmission processing unit 104 supplies the data frame to the data processing unit 102. The data processing unit 102 processes and analyses the data frame and the data packet supplied from the transmission processing unit 104.

The control unit 108 is a block which controls each of the operations of the data processing unit 102, the transmission processing unit 104, and the wireless interface unit 106. The control unit 108 decides a transmission/reception frequency (operating frequency). Further, the control unit 108 performs operations such as creating a control message, providing an instruction to send the control message, and interpreting the control message. The control message includes notification information such as a beacon, a probe request, and an association request and response information such as a reception response of the beacon, a probe response, and an association response. Further, the control unit 108 controls various operations such as the reception operation and the transmission operation of the wireless communication device 100.

As shown in FIG. 7, the control unit 108 includes, as major functional components, a control-message creation/transmission-instruction unit 108a, a reception/interpretation processing unit 108b, a comparison unit 108c, an operation mode determination unit 108d, and an operating frequency setting/switching unit 108e. The control-message creation/transmission-instruction unit 108a creates the control message and provides an instruction to send the control message. The reception/interpretation processing unit 108b performs reception processing and interpretation processing of the control message sent from a communication partner. The comparison unit 108c compares, based on the interpretation of the control message performed by the reception/interpretation processing unit 108b, an information element of the wireless communication device 100 with an information element sent from the communication partner. The operation mode determination unit 108d performs an operation of determining, based on the result obtained from the comparison performed by the comparison unit 108c, which of the wireless communication device 100 and the communication partner plays the role of a master device or a slave device. The determination result obtained from the operation mode determination unit 108d is included in the control message and is sent to the communication partner device. The operating frequency setting/switching unit 108e performs setting/switching processing of the operating frequency in State 2 and State 14.

The memory 110 has a role as a work area of the data processing performed by the control unit 108 and a function as a storage medium for storing various data. As the memory 110, various recording media such as a volatile memory such as a DRAM, a non-volatile memory such as an EEPROM, a hard disk, and an optical disk can be used. Note that, each block shown in FIG. 7 can be configured by hardware (circuit). Further, each block can be also configured by a calculation processing unit (CPU) and a software (program) for causing the CPU to operate. In this case, the program can be stored in a recording medium such as the memory 110 provided in the wireless communication device 100.

As described above, in the state transition shown in FIG. 6, information elements such as capabilities of the wireless device, a power limitation situation, and a priority index for master device operation are included in each of the messages of the beacon, the probe request, the probe response, the association request, and the association response. The control-message creation/transmission-instruction unit 108a creates a control message containing the information and performs transmission processing. Further, the reception/interpretation processing unit 108b performs reception processing and interpretation processing of the control message containing the information.

According to the first embodiment as described above, it becomes possible to reliably decide which device is to operate as the master device and which device is to operate as the slave device at the time of two wireless devices are connected to each other. Therefore, it becomes possible to cause the device with a more suitable function for working as a master device to operate as the master device. Thus, the degree of freedom of the P2P connection can be improved, and opportunities for connecting devices to each other can be increased. Further, the connection is independent on the time at which a state transition between the master device and the slave device occurs, and the time period required for establishing a connection can be reduced. This enables to form a more appropriate network topology. Further, the mechanism of an existing wireless LAN defined by IEEE802.11 or the like can be used as it is, and hence, the device connection utilizing existing infrastructure can be realized. In addition, the compatibility with an existing device can be maintained by using the existing infrastructure.

Figure 8:
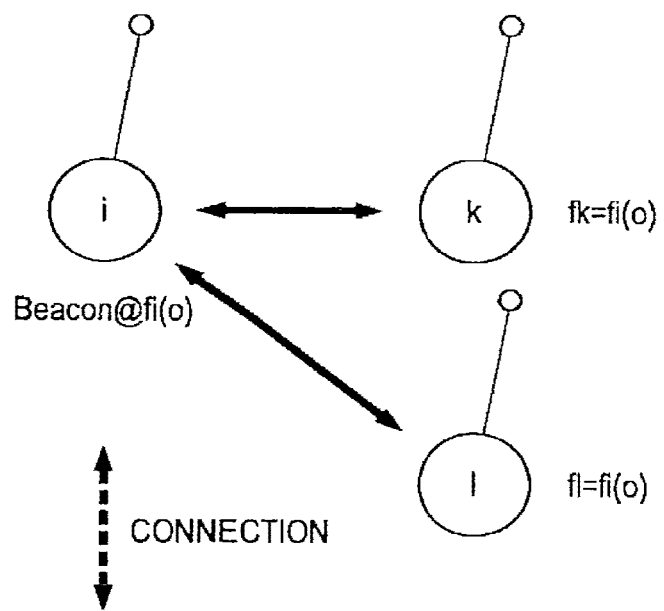
FIG. 8 is a schematic view showing a system configuration example according to a second embodiment.
Figure 8:
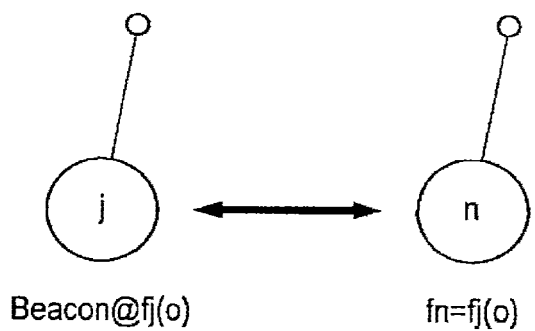

2. Second Embodiment (1) System Configuration Example According to Second Embodiment Next, a second embodiment of the present invention will be described. In the second embodiment, there is provided a mechanism for establishing a connection between a master device which is already connected to a slave device and has a slave device linked thereto and another wireless device. FIG. 8 is a schematic view showing a system configuration example according to the second embodiment. FIG. 8 is a schematic view showing a state where two slave devices (a wireless device k and a wireless device 1) are each connected to a wireless device i operating as a master device, and one slave device (a wireless device n) is connected to a wireless device j operating as a master device. The wireless device i sends a beacon at an operating frequency fi(0), and the wireless device k and the wireless device 1 are connected to the wireless device i at the frequency fi(0). Further, the wireless device j sends a beacon at an operating frequency fj(0), and the wireless device n is connected to the wireless device j at the frequency fj(0). Hereinafter, there is given an example of connecting the wireless device i operating as a master device and the wireless device j operating as another master device to each other.

Figure 9:
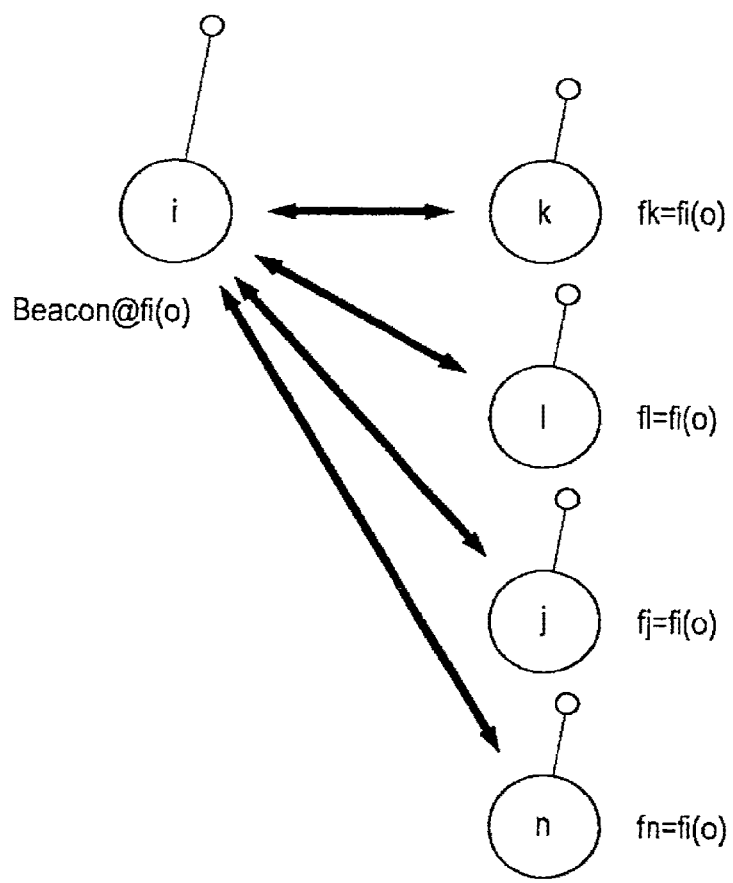
FIG. 9 is a schematic view showing an example in which two networks shown in FIG. 8 are integrated in a manner that the wireless device i operates as a master device to the other devices.
Figure 10:
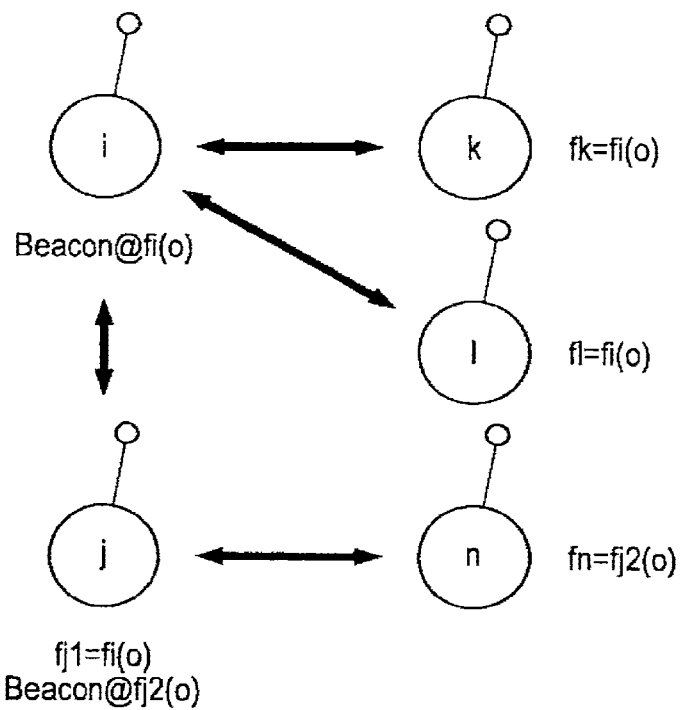
FIG. 10 is a schematic view showing an example in which the wireless device j operates as a slave device to the wireless device i and the wireless device j also operates as a master device to the wireless device n.

In the case of connecting to each other the wireless device i and the wireless device j, which are shown in FIG. 8, there can be assumed two methods shown in FIG. 9 and FIG. 10. FIG. 9 shows an example in which the two networks shown in FIG. 8 are integrated in a manner that the wireless device i operates as a master device to the other devices, and the wireless device j, which originally has been operated as a master device, then operates as a slave device to the wireless device i. Further, the wireless device n, which has been operated as a slave device to the wireless device j, newly operates as a slave device to the wireless device i. Accordingly, the wireless devices k, i, j, and n are connected to the wireless device i at the frequency fi(0), which is the operating frequency of the wireless device i. The wireless device j firstly notifies the wireless device n of new connection destination information (SSID, operating frequency, etc.) of the wireless device i which is to operate as a master device, and then establishes the connection with the wireless device i. Thus, the wireless device n can be connected to the wireless device i and operates as a slave device to the wireless device i.

FIG. 10 shows an example in which the wireless device j operates as a slave device to the wireless device i and the wireless device j also operates as a master device to the wireless device n. The wireless device j operates at the frequency fi(0) when communicating with the wireless device i, which is the operating frequency of the wireless device i. Further, the wireless device j sends a beacon at an operating frequency fj2(0) when communicating with the wireless device n. The wireless device n is connected to the wireless device j at the frequency fj2(0), which is the operating frequency of the wireless device j.

In the case of FIG. 10, the wireless device j operates as a master device to the wireless device n, and operates as a slave device to the wireless device i. The wireless device j realizes its functions as a master device and a slave device by (1) a simultaneous operation of respective wireless devices by being provided therewith a plurality of wireless devices, (2) an operation in time-division (random access) at a same frequency, (3) an operation in time-division (time slot division) at a different frequency, and the like.

In the case of the method (1), for example, when the wireless device j is provided with two wireless devices, one having an operating frequency of 2.4 [GHz] and the other having an operating frequency of 2.5 [GHz], the wireless device j performs connection to the wireless device i by using the wireless device having an operating frequency of 2.4 [GHz] and performs connection to the wireless device n by using the wireless device having an operating frequency of 2.5 [GHz]. In this case, the wireless device j can communicate simultaneously with both wireless devices i and n.

Figure 11:
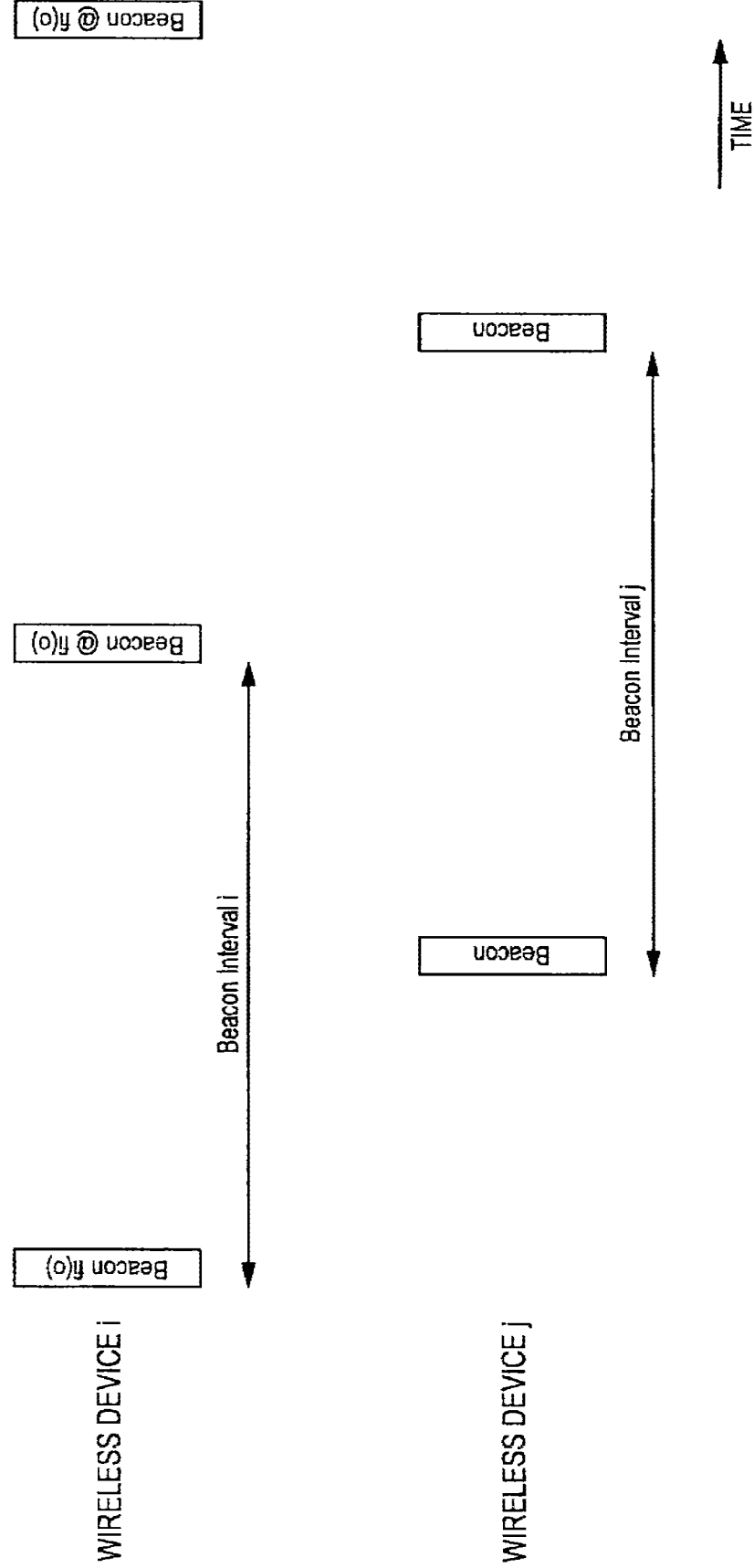
FIG. 11 is a schematic view showing a case where, in the case of FIG. 10, the wireless device j performs time-division at a same frequency.

FIG. 11 is a schematic view showing a case where the wireless device j performs time-division at a same frequency by using the method (2). In this case, the wireless device i sends beacons each having the same frequency fi(0) at a beacon interval i (beacon Interval i). The wireless device j sends beacons each having the same frequency fi(0) at a beacon interval j (beacon Interval j), and while the wireless device j sends the beacons, the wireless device j functions as a master device to the wireless device n. Further, during the period in which the beacon transmission is not being performed, the wireless device j waits for a beacon sent from the wireless device i and also waits for a response sent from the wireless device n, and functions as a slave device to the wireless device i. Each of the beacon intervals i and j can be set to a random time.

Figure 12:
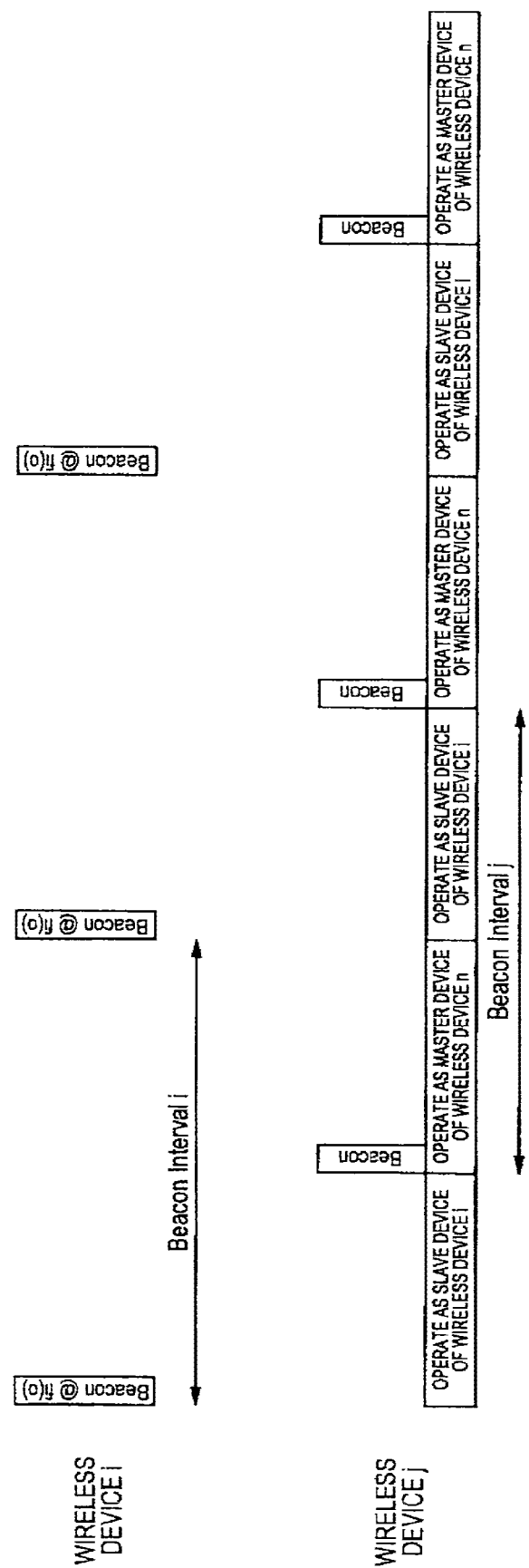
FIG. 12 is a schematic view showing a case where, in the case of FIG. 10, the wireless device j performs time-division at a different frequency.

FIG. 12 is a schematic view showing a case where the wireless device j performs time-division at a different frequency by using the method (3). In this case, the wireless device i sends beacons each having the same frequency fi(0) at the beacon interval i in the same manner as in FIG. 10. On the other hand, the wireless device j sends beacons each having the same frequency fj2(0) at the beacon interval j, and during the former predetermined time period of the beacon interval j, the wireless device j receives a response from the wireless device n and operates as a master device to the wireless device n. Further, during the latter predetermined time period of the beacon interval j, the wireless device j operates at the frequency fi(0), which is the operating frequency of the wireless device i, and operates as a slave device to the wireless device i. In this case, the beacon transmission and the switching of frequency performed by the wireless device j are performed at regular cycles with time slot division.

Figure 13:
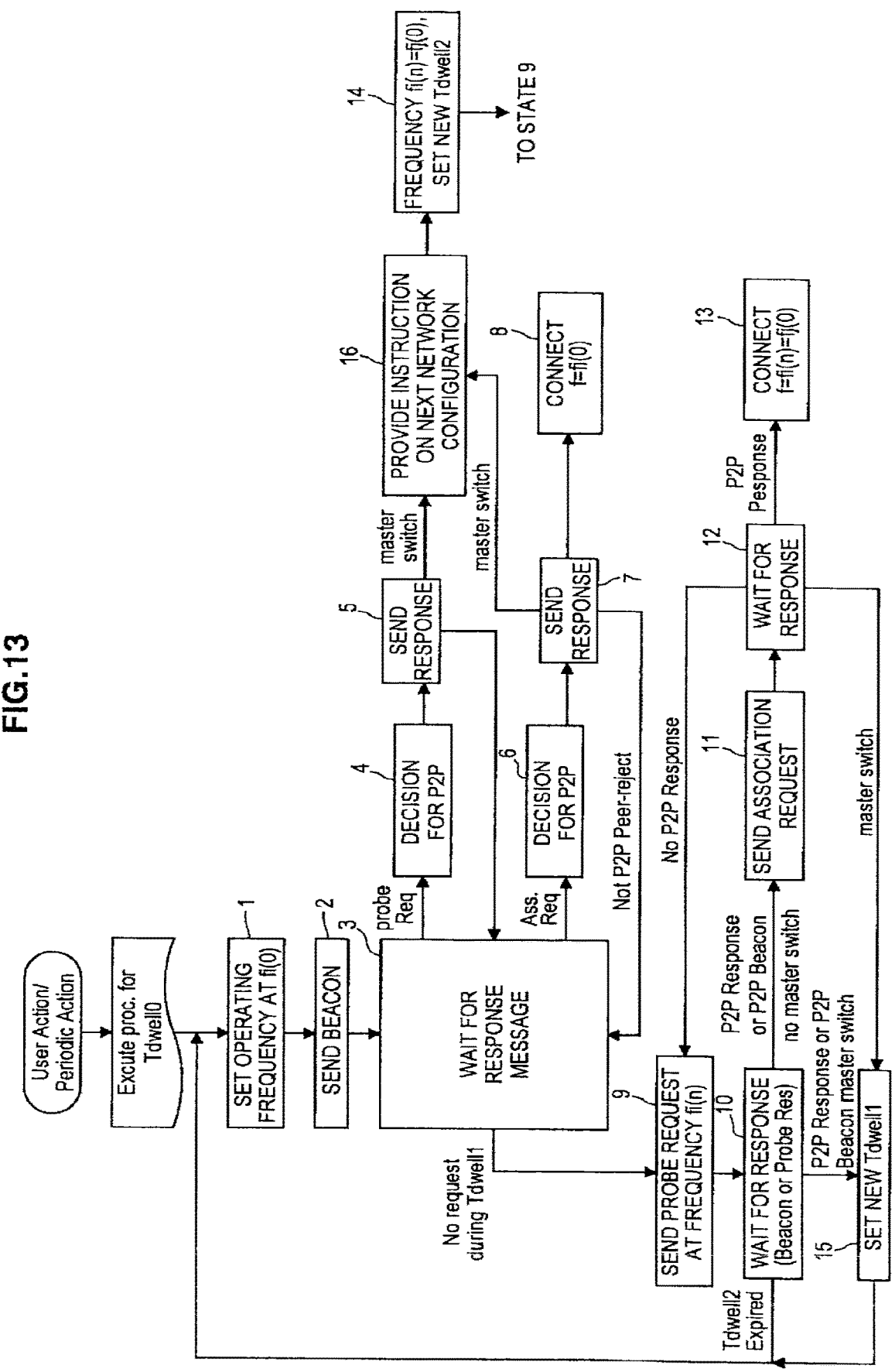
FIG. 13 is a state transition diagram showing an operation of a wireless communication device according to a second embodiment of the present invention.

(2) State Transition of Wireless Communication Device According to Second Embodiment FIG. 13 is a state transition diagram showing an operation of a wireless communication device 100 according to the second embodiment of the present invention. In this embodiment, a sequence for deciding an operation mode (master device or slave device) is added after a connection partner is found without adding a protocol, to thereby realize an appropriate connection system, and, in addition, whether to operate as a master device or as a slave device is decided depending on a connection state such as the number of slave devices linked to each device.

In FIG. 13, the basic operations in States having the same reference numerals as in FIG. 6 are performed in the same manner as in FIG. 6. In FIG. 13, State 16 is added to States shown in FIG. 6. Hereinafter, the description will be focused on the points that differ from the first embodiment.

As described in the first embodiment, the information necessary for deciding the master device operation mode or the slave device operation mode is included in each of the control messages of the beacon, the probe request, the probe response, the association request, and the association response. In the second embodiment, the following pieces of information are added to the information for determining the master device operation mode or the slave device operation mode: (i) the number of slave devices linked thereto; (ii) the presence or absence of a master device/slave device-simultaneous operation function; and the like. Further, in the second embodiment, the following pieces of information are also added to the information for determining the master device operation mode or the slave device operation mode: (iii) the capabilities of the slave device linked thereto; (iv) the state of communication application of the slave device linked thereto; and the like. Here, the master device/slave device-simultaneous operation function refers to a function that can carry out both operations as a master device and a slave device in the same manner as the wireless device j described in FIG. 11 and FIG. 12.

Further, in the second embodiment, in the determination performed in State 4, a network configuration is decided based on the pieces of determination information (i) to (iv) included in the probe request, the information corresponding to the wireless communication device, and the like. For example, it is decided that the wireless device j operates as a slave device to the wireless device i, because the number of the slave devices linked to the wireless device i is greater than the number of the slave devices connected to the wireless device j. Then, the wireless device j changes the network configuration based on the following conditions: (a) the slave device n, which is connected to the wireless device j, has a capability to connect to the wireless device i; (b) the communication applications of the slave device j and the slave device n are not delay-critical; and (c) the communication applications of the slave device j and the slave device n do not occupy a wide frequency band. Those conditions are determined by the control unit 108 depending on the capabilities and the states of communication application of the wireless devices j and n. In the case where the above three conditions are satisfied, the wireless device j transits to State 16 and changes the network configuration to the state shown in FIG. 9. Note that the determination on the condition (c) can be performed based on a predetermined threshold.

In the case of the network configuration shown in FIG. 9, the wireless device j operates as a slave device to the wireless device i. Accordingly, the wireless device j transits from State 16 to State 14.

In the case of the network configuration shown in FIG. 9, the communication between the wireless device j and the wireless device n is performed via the wireless device i which operates as a master device. At that time, a desired communication between the wireless device j and the wireless device n cannot be realized when any one of the three conditions (a) to (c) is not satisfied. Therefore, in the case where any one of the three conditions (a) to (c) is not satisfied, the wireless device j changes the network configuration to the state shown in FIG. 10 in State 16. In this case, as described above, the wireless device j operates as a slave device to the wireless device i and operates as a master device to the wireless device n. Accordingly, both the communication between the wireless devices i and j and the communication between the wireless devices j and n can be performed without causing a delay or occupying a wide frequency band.

Further, in State 6, the determination is performed based on the information included in the association request in the same manner as in State 4. For example, it is decided that the wireless device j operates as a slave device to the wireless device i, because the number of the slave devices linked to the wireless device i is greater than the number of the slave devices linked to the wireless device j. Then, in the case where the above three conditions are satisfied, the wireless device j transits from State 7 to State 16 and changes the network configuration to the state shown in FIG. 9.

Further, in the case where any one of the three conditions (a) to (c) is not satisfied, the wireless device j transits from State 7 to State 16 and changes the network configuration to the state shown in FIG. 10. In this case, as described above, the wireless device j operates as a slave device to the wireless device i and operates as a master device to the wireless device n.

Further, in State 16, the wireless device i sends a network configuration change notification to each of the slave devices linked thereto in order to change the network configuration to the state shown in FIG. 9 or FIG. 10. For example, in the case of realizing the connection shown in FIG. 9, the wireless device j notifies the wireless device n of information (ESSID, operating frequency, and the like of the wireless device i) on the wireless device i which is to operate as a master device to the wireless device n and prompts the wireless device n to reconnect to the wireless device i. Note that, in the case where the change of a connection destination is unnecessary, there is no need to send the network configuration change notification.

(3) Configuration of Wireless Communication Device According to Second Embodiment A configuration of the wireless communication device according to the second embodiment is the same as that of the wireless communication device according to the first embodiment described in FIG. 7. As described above, in the second embodiment, the pieces of information (i) to (iv) are added to the information of the first embodiment as the information for determining the master device operation mode or the slave device operation mode. The control-message creation/transmission-instruction unit 108a creates a control message including the pieces of determination information (i) to (iv) in addition to the information for determining the operation mode according to the first embodiment, and performs transmission processing.

Further, in the case of changing the network configuration to the state shown in FIG. 9, the control-message creation/transmission-instruction unit 108a creates a control message including a connection instruction containing information (ESSID, operating frequency, and the like of the wireless device i) on a wireless device to be a connection destination, and performs transmission processing.

The reception/interpretation processing unit 108b receives the control message including the pieces of determination information (i) to (iv) and performs interpretation of the message. The comparison unit 108c compares, based on the interpretation of the control message performed by the reception/interpretation processing unit 108b, an information element of the wireless communication device with an information element sent from the communication partner. The operation mode determination unit 108d performs an operation of determining, based on the result obtained from the comparison performed by the comparison unit 108c, which of the wireless communication device and the communication partner plays the role of a master device or a slave device. Further, in the case of changing the network configuration to the state shown in FIG. 10, the operation mode determination unit 108d changes the operation mode in the manner that the operation mode switches between the master device operation and the slave device operation depending on a connection partner. In the case of changing the network configuration to the state shown in FIG. 10, the operating frequency setting/switching unit 108e performs setting/switching processing of the operating frequency when switching the frequency by means of time slot division described in FIG. 12.

As described above, according to the second embodiment, it becomes possible to cause the device with a more suitable function for working as a master device to operate as a master device depending on the network situation, for example, the situation where a device to be connected already has a slave device linked thereto. In this manner, a plurality of networks can be integrated in the most efficient state.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-104445 filed in the Japan Patent Office on Apr. 22, 2009, the entire content of which is hereby incorporated by reference.

What is claimed is:

1. A wireless communication device comprising:
   circuitry configured to:
      send first request information via a wireless communication network using a first frequency;
      wait, from another device which has received the first request information, for first response information with respect to the first request information using the first frequency for a predetermined duration;
      receive the first response information from the another device;
      in response to receiving the first response information, send first operation mode determination information indicating a priority index of the wireless communication device to the another device;
      receive, from the another device, second operation mode determination information indicating a priority index of the another device; and
      determine, based on the first and the second operation mode determination information, that the wireless communication device is caused to operate as one of a master device or a slave device.

2. The wireless communication device according to claim 1, wherein the first request information is a periodic message sent from the wireless communication device when operating as a master device or a message repeatedly sent within a fixed time period.

3. The wireless communication device according to claim 2, wherein the wireless communication device is caused to operate as a slave device in case that a priority index of the wireless communication device is lower than the priority index of the another device.

4. The wireless communication device according to claim 1, wherein the first request information is communication request information sent from the wireless communication device when the wireless communication device is operating as a slave device, and the first response information is response information sent from the another device when the another device is operating as a master device.

5. The wireless communication device according to claim 1, wherein the circuitry is further configured to switch a communication frequency at a time of sending the first request information of the wireless communication device and a communication frequency at a time of waiting for the first response information from the another device.

6. The wireless communication device according to claim 1, wherein the circuitry is further configured to:
   compare the second operation mode determination information received from the another device with the first operation mode determination information; and
   determine, based on a result of the comparison, that the wireless communication device is caused to operate as one of a master device and a slave device.

7. The wireless communication device according to claim 1, wherein the circuitry is configured to cause the wireless communication device to operate in a manner that an operation switches between a master device operation and a slave device operation in case the wireless communication device is connected to a plurality of other devices via a wireless communication network.

8. The wireless communication device according to claim 1, wherein the first request information of the wireless communication device includes an instruction for causing a second other device, which is already connected as a slave device to the wireless communication device, to operate as a slave device to a first other device in case the wireless communication device operates as a slave device to the first other device which is newly connected thereto via a wireless communication network.

9. The wireless communication device according to claim 1, further comprising:
   a memory configured to function as a work area for data processing performed by the circuitry and to function as a storage medium for storing data.

10. The wireless communication device according to claim 1, further comprising:
    an antenna configured to receive a signal including the first and second response information.

11. The wireless communication device according to claim 10, wherein the circuitry is configured to down-convert the signal including the first and second response information received by the antenna.

12. The wireless communication device according to claim 1, wherein the wireless communication device is caused to operate as a master device in case that a priority index of the wireless communication device is lower than the priority index of the another device.

13. A wireless communication method performed by a wireless communication device, the method comprising:
    sending first request information via a wireless communication in network using a first frequency;
    waiting, from another device which has received the first request formation, for first response information with respect to the first request information using the first frequency for a predetermined duration;
    receiving the first response information from the another device;
    in response to receiving the first response information, sending first operation mode determination information indicating a priority index of the wireless communication device to the another device;
    receiving, from the another device, second operation mode determination information indicating a priority index of the another device; and
    determining, based on the first and the second operation mode determination information, that the wireless communication device is caused to operate as one of a master device or a slave device.

14. A non-transitory, computer-readable storage medium storing instructions that, when executed by a wireless communication a wireless communication device, control the wireless communication device to perform a method comprising:
    sending first request information via a wireless communication in network using a first frequency;
    waiting, from another device which has received the first request information, for first response information with respect to the first request information using the first frequency for a predetermined duration;
    receiving the first response information from the another device;
    in response to receiving the first response information, sending first operation mode determination information indicating a priority index of the wireless communication device to the another device;

receiving, from the another device, second operation mode determination information indicating a priority index of the another device; and determining, based on the first and the second operation mode determination information, that the wireless communication device is caused to operate as one of a master device or a slave device.

\* \* \* \* \*